Patented Sept. 22, 1931

1,824,588

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

DUST LAYER HAVING IMPROVED HYGROSCOPIC PROPERTIES

No Drawing.  Application filed November 6, 1928.  Serial No. 317,684.

The present invention is concerned with an improvement in dust layers, specifically with an improved form of calcium chloride for dust laying.

Calcium chloride is widely used in large quantity as a dust layer upon gravel roads and the like, its hygroscopic property being utilized to absorb moisture from the air, thereby wetting the dust and making roads, otherwise dusty, either entirely dustless or greatly reducing the dust nuisance. There has also been employed less widely and in much less quantity a mixed dust layer comprised of calcium chloride and magnesium chloride in the approximate proportions in which they exist in natural brines, such mixed chlorides being produced by boiling down the mother liquors from such brines after removal of the common salt. The dust laying capacity of such mixed chlorides has been found, however, to be somewhat less than the practically pure calcium chloride and the latter has been widely preferred.

We have found, however, that if the proportion of $MgCl_2$ to $CaCl_2$ in a prepared dust layer be controlled within certain narrow limits, there is obtained a product having superior dust laying qualities.

To the accomplishment of the foregoing and related ends, the invention, then, consists of the methods and ingredients hereinafter fully described and particularly pointed out in the claims, the following description setting forth in detail several methods of procedure and approved combinations of ingredients embodying our invention, such disclosed modes and combinations constituting, however, but several of the various ways in which the principle of the invention may be used.

When a divided form of calcium chloride, such as flake or granular calcium chloride is spread upon a dusty highway or road, it absorbs water by reason of its hygroscopic nature, going into solution, such solution spreading throughout the road surface by reason of capillarity. The absorption of water takes place most readily towards evening and during the night when the road has no longer a high temperature under the direct rays of the sun and the humidity of the air has naturally increased. Upon the recurrence of hot dry conditions, as for instance upon the day following the calcium chloride solution wetting the road surface, under extreme conditions of heat or arid atmosphere will be concentrated by evaporation with loss of water to the air and the effectiveness of its dust laying performance relative to other competing materials will be measured by its relative resistance to drying out under arid conditions involving a high road surface temperature.

When a solution of calcium chloride containing magnesium chloride is concentrated by evaporation at reduced pressure, various forms of hydrated salts crystallize out including tachydrite $CaCl_2.2MgCl_2.12H_2O$, and at the final point of concentration at a temperature approximately 35° C. to 93° C., the mother liquor will contain from 6 to 10 parts of magnesium chloride ($MgCl_2$) per 100 parts of calcium chloride ($CaCl_2$).

Further such evaporation of such solution does not appreciably change the said ratio of $MgCl_2$ to $CaCl_2$ content thereof, hence such a solution constitutes the most hygroscopic one which may be obtained with

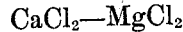

$CaCl_2$—$MgCl_2$ mixtures or with $CaCl_2$ only within said temperature range, which includes therein the critical road temperatures normally met with in road treatment.

It follows therefore that such a mixed chloride solution will exhibit hygroscopic properties greater than will a pure $CaCl_2$ solution under critical road temperature condition.

If then a dust layer, containing both magnesium and calcium chlorides, be spread upon a road and there be more magnesium chloride relative to calcium chloride than corresponds to the composition of such tachydrite mother liquor, the chloride solution when once formed will be dried up when the road becomes hot under the sun by the separation of tachydrite crystals until the remaining solution corresponds to tachydrite mother liquor containing 6 to 10 parts of $MgCl_2$ per 100 parts of $CaCl_2$. It follows that if the original composition spread upon the road had the composition of the final mother liquor, there would have been available the maximum percentage of chloride used, namely, 100 per cent. in the form of final tachydrite mother liquor, which would exhibit the highest hygroscopic qualities and persistent dust laying capacity in the face of increasing road temperature and low atmospheric humidity.

We have found by actual tests that such a dust layer exhibits superior dust laying qualities because of its dust laying capacity per unit weight, such increased dust laying capacity being exhibited at the high road temperatures which occur under the sun's heat during the day when the efficacy of a dust layer is put to its severest test.

We may prepare such a dust layer in various ways, but where calcium chloride is prepared for dust laying from natural brines containing magnesium chloride and methods of separation of magnesium chloride from calcium chloride are employed involving the separation from a mixed solution of said chloride of tachydrite crystals, a mother liquor will result in which the ratio of magnesium to calcium is within the range herein indicated as having the highest dust laying qualities. We accordingly use such mother liquor for dust laying either as such or diluted as desired or if a solid form is preferred we concentrate such mother liquor to the proper consistency or strength, solidify it and granulate, flake or otherwise subdivide it into convenient sized particles which product may then be advantageously surface dried in order to improve its free-flowing and non-caking characteristics when packaged.

On the other hand we may prepare the optimum mixture by adding to a pure calcium chloride solution or to one containing less than the optimum amount of magnesium chloride a suitable dosage thereof, preferably in the solution form, and use it as above stated or we may proceed to finish it in any manner convenient to produce the granular, flaked or otherwise divided solid form suitable for spreading upon a road.

In the preparation of our dust layer, we prefer to proceed in the following manner.

Having prepared a solution of calcium chloride and magnesium chloride in the approximate optimum proportions, we concentrate same to a condition permitting flaking upon a cooled rotary drum and we then superficially dry the so prepared flakes in accordance with the method disclosed by Cottringer and Collings U. S. Patent No. 1,527,121, after which we cool the hot dried flakes in a counter current of air, whereupon the so cooled flakes are ready for packaging.

In preparing tachydrite mother liquor or a solution of $CaCl_2$ and $MgCl_2$ having a composition within the range herein stated, we may concentrate by evaporation thereof to form a slurry of crystals of double salt ($2CaCl_2.MgCl_2.6H_2O$) and mother liquor saturated therewith and then solidify and form particles of the solid chloride in accordance with the disclosure in a copending application, Serial No. 317,495, filed November 5, 1928, by Sheldon B. Heath, and then proceed with superficial drying. Free-flowing and non-caking characteristics follow reduction of the equivalent total content of anhydrous salts below the content thereof corresponding to hydrated crystal forms present in the final product.

Aside from the advantage of greater dust laying capacity our improved product may be more cheaply made from brines containing magnesium and calcium chlorides than the substantially pure calcium chloride heretofore widely used.

We have found further that the addition of small quantities of other materials notably calcium nitrate and/or zinc chloride still further accentuates the improvement in hygroscopic property. Such additive materials are, however, more costly and although beneficial and indicated as economic in cases where the highest development of the hygroscopic property is essential, we prefer in general to employ the relatively cheap magnesium chloride as the additive ingredient.

Improved dust laying capacity will result from inclusion of minor percentages of such other salts in like or even less proportions than herein stated for $MgCl_2$ and such improvement will follow the inclusion of same only with the calcium chloride or together with magnesium chloride.

A mixed dust layer of the character described and intended by us to come within the scope of our invention may be prepared by mechanically mixing a divided form of calcium chloride with the proper proportion of a divided form of magnesium chloride, the latter being preferably in a finely divided form so as to insure substantially uniform distribution throughout the larger mass of calcium chloride.

Other modes of applying the principle of our invention may be employed instead of those explained, change being made as regards the methods employed, provided the step or steps or ingredients stated by any of the following claims or the equivalent of such stated step or steps or ingredients be employed.

We therefore particularly point out and distinctly claim as our invention:—

1. The method of laying dust which comprises distributing on the surface to be treated a mixture of $CaCl_2$, $MgCl_2$ and water in which the $MgCl_2$ content is 6 to 10 per cent. of the $CaCl_2$ content thereof.

2. The method of laying dust which comprises distributing on the surface to be treated a mixture of hydrated calcium chloride and a minor percentage of another hygroscopic salt capable of lowering the vapor tension of a water solution of the mixture below that of a saturated solution of calcium chloride only.

3. As a new article of manufacture, a mixture of $CaCl_2$, $MgCl_2$ and water in which the $MgCl_2$ content is 6 to 10 per cent. of the $CaCl_2$ content thereof.

4. As a new article of manufacture, a dust layer comprising a mixture of hydrated calcium chloride and a minor percentage of another hygroscopic salt capable of lowering the vapor tension of a water solution of the mixture below that of a saturated solution of calcium chloride only.

5. As a new article of manufacture, a dust layer comprising a hygroscopic salt mixture containing chiefly hydrated calcium chloride together with magnesium chloride in the proportion of 6 to 10 per cent. of $MgCl_2$ relative to the $CaCl_2$ content thereof.

6. As a new article of manufacture, a dust layer comprising a mixture of hydrated calcium chloride and such a minor percentage of magnesium chloride which when dissolved in water produces a solution having at saturation a lower vapor tension than a saturated solution of calcium chloride only at elevated road temperatures.

7. As a new article of manufacture, a dust layer comprising hydrated calcium chloride with which has been compounded magnesium chloride in the proportion of 6 to 10 per cent. of equivalent $MgCl_2$ relative to the $CaCl_2$ content of the mixture.

8. As a new article of manufacture, a dust layer comprising a mixture of hygroscopic salts in comminuted form exhibiting non-caking characteristics when packaged, comprising chiefly hydrated calcium chloride, together with a minor percentage of another hygroscopic salt capable of imparting to a saturated solution of the mixture a lower vapor tension than exhibited by a saturated solution of calcium chloride only at elevated road temperatures.

9. As a new article of manufacture, a dust layer comprising a mixture of hygroscopic salts in comminuted form exhibiting non-caking characteristics when packaged, comprising chiefly hydrated calcium chloride, together with a 6 to 10 per cent. $MgCl_2$ relative to the $CaCl_2$ present.

10. As a new article of manufacture, a dust layer comprising superficially dried flakes of a mixture of hygroscopic salts, containing chiefly hydrated calcium chloride, together with from 6 to 10 per cent. $MgCl_2$ relative to the $CaCl_2$ content thereof.

11. As a new article of manufacture, a hydrated calcium chloride in the form of particles superficially dried before packaging and containing $MgCl_2$ in the proportion of 6 to 10 per cent. thereof relative to the $CaCl_2$ content of the mixture.

12. As a new article of manufacture, a hydrated calcium chloride-magnesium chloride mixture in the form of particles and containing the $MgCl_2$ in the proportion of 6 to 10 per cent. thereof relative to the $CaCl_2$ content of the mixture.

13. As a new article of manufacture, a hydrated calcium chloride-magnesium chloride mixture in the form of particles superficially dried before packaging, and containing the $MgCl_2$ in the proportion of 6 to 10 per cent. thereof relative to the $CaCl_2$ content of the mixture.

14. As a new article of manufacture, a dust layer derived from tachydrite mother liquor containing 6 to 10 per cent. $MgCl_2$ relative to the $CaCl_2$ content thereof.

Signed by us this 1st day of November, 1928.

EDWIN O. BARSTOW.
SHELDON B. HEATH.